United States Patent [19]

Hagan

[11] Patent Number: 5,291,398
[45] Date of Patent: Mar. 1, 1994

[54] METHOD AND SYSTEM FOR PROCESSING FEDERALLY INSURED ANNUITY AND LIFE INSURANCE INVESTMENTS

[76] Inventor: Bernard P. Hagan, 115 Commonwealth Ave., San Francisco, Calif. 94118

[21] Appl. No.: 911,401

[22] Filed: Jul. 10, 1992

[51] Int. Cl.⁵ .......................................... G06F 15/20
[52] U.S. Cl. .................................................. 364/408
[58] Field of Search .......................................... 364/408

[56] References Cited

U.S. PATENT DOCUMENTS 4,985,833 1/1991 Oncken ............................... 364/408

Primary Examiner—Roy N. Envall, Jr.
Assistant Examiner—Ari M. Bai
Attorney, Agent, or Firm—Robert C. Kain, Jr.

[57] ABSTRACT

The method and system for electronically processing transactional data and monitoring annuity funds includes identifying and storing annuity fund data, customer data, annuity beneficiary data, and banking institution data. Banking institutions which hold non-annuity funds for a particular annuity beneficiary are classified as non-available banking institutions for that beneficiary. The system sums all annuity funds identified with a single annuity beneficiary and designated for certificates of deposits issued by one of the banking institutions that is not classified as a non-available banking institution. If the sum exceeds the predetermined fund limit, that identified banking institution is classified as a non-available banking institution for that particular annuity beneficiary. The system then commands the transfer of all additional annuity funds identified with that single annuity beneficiary to another banking institution that is an available institution. In a preferred embodiment, the system generates various reports showing available banking institutions for each annuity beneficiary, non-available banking institutions for each annuity beneficiary, and the sum of all annuity funds for each respective annuity beneficiary that are provided by a corresponding customer. The method and system also stores and processes information regarding purchased certificates of deposit (CDs) and the due dates of those CDs such that when a particular CD becomes due and the principal is returned to the annuity company, the system declassifies the issuing banking institution from non-available to available for a particular annuity beneficiary or group of beneficiaries.

26 Claims, 3 Drawing Sheets

METHOD AND SYSTEM FOR PROCESSING FEDERALLY INSURED ANNUITY AND LIFE INSURANCE INVESTMENTS

BACKGROUND OF THE INVENTION

The present invention relates to a method and a system for electronically processing transactional data and monitoring funds invested in a plurality of annuities or life insurance investments such that the invested funds are protected by depositor's insurance, such as FDIC insurance.

Federally approved banking institutions, banks and savings and loans, pay premiums to the federal government such that money on deposit in those banking institutions is federally insured. If the banking institution becomes insolvent for any reason, the federal government pays the depositor for any losses up to an established insured limit. At present, deposits are insured up to $100,000.00. There is a regulation which provides that funds deposited by life insurance companies or a corporation solely to fund life insurance or annuity contracts will be insured up to the depositor's insurance limit ($100,000.00) per individual (annuitant) entitled to receive benefits under the contract. The persons entitled to receive benefits under an annuity contract are called herein "annuity beneficiaries" whether those persons are legally classified as annuitants or as beneficiaries. An annuity contract is a contract that pays an annuity beneficiary an amount at regular intervals or pays an annuity beneficiary a lump sum at a predetermined time in the future. The annuity contract is funded or provided for by a customer. Essentially, the customer pays a certain amount of money to a company, the company invests that money, and the company at a certain time in the future or at regular intervals pays the annuity beneficiary a prescribed amount as required under the annuity contract. Annuity beneficiaries are sometimes called "annuitants."

Some types of annuity contracts are deferred annuity contracts. Deferred annuity contracts allow funds to be accumulated on a tax deferred basis over the term of the contract and pay a lump sum or make periodic payments to annuitants at a certain time in the future. For example, a customer may fund a deferred annuity and, upon retirement of the customer, the company holding the annuity pays the customer either a lump sum or periodic payments as selected by the annuitant. In this example, the contract is annuitized upon retirement of the customer. If the contract is surrendered during early years, there are surrender penalties. If there are partial withdrawals, penalties sometimes apply. Interest if withdrawn is reportable as income in the year of withdrawal.

In order to obtain the benefit of the depositor's insurance, the corporation holding the annuity must establish an internal account for the annuity beneficiary and place the funds on deposit with a federally approved institution (FDIC institution) in the corporation's own name. However, the corporation can accumulate and combine investments for a number of annuity beneficiaries and invest that aggregate sum with a single banking institution. The regulations provide that, in the event the banking institution becomes insolvent, the federal agency providing the depositors' insurance will pay the company for losses sustained by a particular annuity beneficiary provided those losses do not exceed the established depositor's insurance limit value.

Tax deferred annuities are presently being marketed throughout the United States by life insurance companies. Tax law presently allows interest earnings in tax deferred annuity accounts to accumulate tax free until withdrawn. Consequently, this form of annuity has become a popular investment, particularly for those saving for their retirement years. However, funds invested in deferred annuities are not federally insured. There have been losses suffered by purchasers of annuities due to the inability of some insurance companies to remain solvent. This is particularly devastating for anyone depending on annuity income for support during retirement years. It would be a great benefit if the features of tax deferred annuities could be combined with federal deposit insurance.

Funds deposited in Federal Deposit Insurance Corporation (FDIC) banks solely to fund annuities or life insurance contracts are currently insured up to $100,000.00 for each annuitant. Present FDIC regulations permit this to be done. A system that enables life insurance and annuity companies to place annuity funds or life insurance funds so as to be covered by federal deposit insurance without exceeding those limitations and which continually monitors accounts for the same purpose, performs a valuable service for the customer.

Individuals that presently have funds in banks can maintain their deposits in different categories of legal ownership which makes it possible to have more than $100,000.00 insurance coverage in a single institution. This is true only if the funds are owned and deposited in different ownership categories. Individuals almost always monitor their deposits in savings institutions so as to maintain full insurance coverage at all times. However, if such individuals purchase a tax deferred annuity that is to be deposited in an insured institution, the responsibility to monitor such funds as to their insurability shifts to the insurance or annuity company. A problem immediately arises since a multi-state life insurance company collecting premiums from thousands of contract holders throughout the U.S. could inadvertently fund an annuitant's contract by depositing funds in an institution in which the annuitant already has a standard deposit, savings account or certificate of deposit. If the funds deposited by the insurance company and the already existing account in that same institution are maintained in the same category of legal ownership, FDIC regulations require that the insured limit must be applied to the combined total amount held within each category. This could result in funds being without insurance coverage. This would be a violation of the contract on the part of the insurance or annuity company that promised to place the funds so as to be federally insured. Given that a multiplicity of insurance companies would be depositing funds in a multiplicity of banks involving annuity accounts from thousands of customers, a system needs to be devised that would safeguard annuity purchasers from the risk of uninsured accounts, and which would enable insurance companies to meet their contractual obligations. Such a system must also periodically monitor accounts focusing on the impact of interest additions to all accounts and the impact thereof as it relates to insurance limits.

OBJECTS OF THE INVENTION

It is an object of the present invention to provide a method and a system for processing transactional data and monitoring funds of a plurality of annuities whereby the funds are fully protected by depositor's insurance.

It is another object of the present invention to provide a method and a system which monitors the value of each annuity beneficiary's fund placed in each banking institution such that the total amount of funds, both principal and interest, in each banking institution are less than a predetermined insured fund limit.

It is another object of the present invention to provide a method and a system which classifies banking institutions as being non-available institutions when the annuity fund in a respective institution for a particular annuity beneficiary exceeds the insured fund limit.

It is a further object of the present invention to provide a method and a system which transfers funds in excess of the insured limit to another available banking institution.

SUMMARY OF THE INVENTION

The method and system for electronically processing transactional data and monitoring annuity funds includes identifying and storing annuity fund data, customer data, annuity beneficiary data, and banking institution data. Banking institutions which hold non-annuity funds for a particular annuity beneficiary are classified as non-available banking institutions for that beneficiary. The system sums all annuity funds identified with a single annuity beneficiary and designated for certificates of deposits issued by one of the banking institutions that is not classified as a non-available banking institution. If the sum exceeds the predetermined fund limit, that identified banking institution is classified as a non-available banking institution for that particular annuity beneficiary. The system then commands the transfer of all additional annuity funds identified with that single annuity beneficiary to another banking institution that is an available institution.

In a preferred embodiment, the system generates various reports showing available banking institutions for each annuity beneficiary, non-available banking institutions for each annuity beneficiary, and the sum of all annuity funds for each respective annuity beneficiary that are provided by a corresponding customer. The method and system also stores and processes information regarding purchased certificates of deposit (CDs) and the due dates of those CDs such that when a particular CD becomes due and the principal is returned to the investment annuity company, the system declassifies the issuing banking institution from non-available to available for a particular annuity beneficiary or group of beneficiaries.

BRIEF DESCRIPTION OF DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a method and a system for electronically processing transactional data and monitoring funds invested in a plurality of annuities in order to obtain the benefit of depositor's insurance available through a plurality of federally approved banking institutions.

Figure 1A:
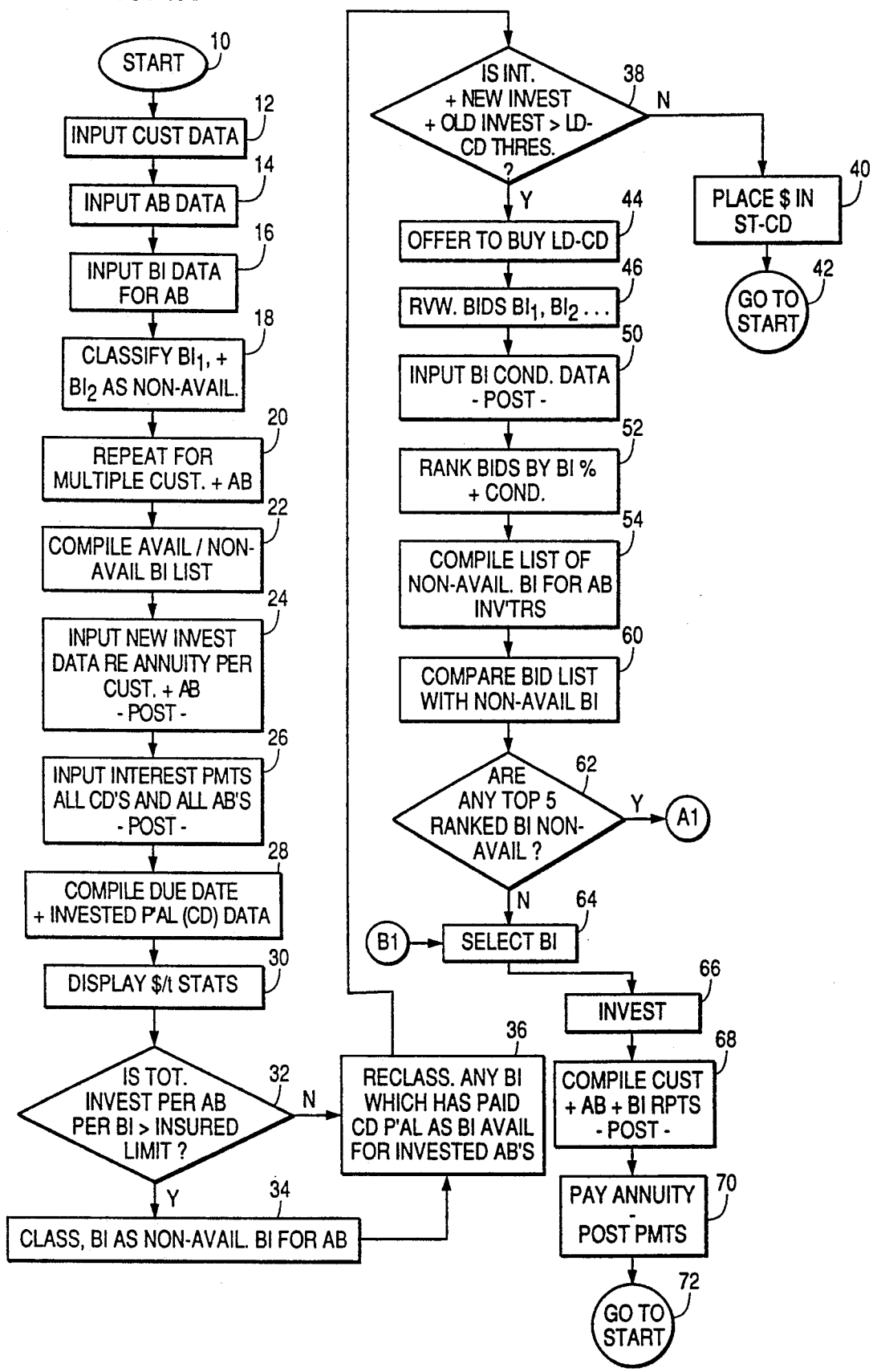
FIGS. 1A and 1B diagrammatically illustrate the method and system for processing transactional data for annuities.
Figure 1B:
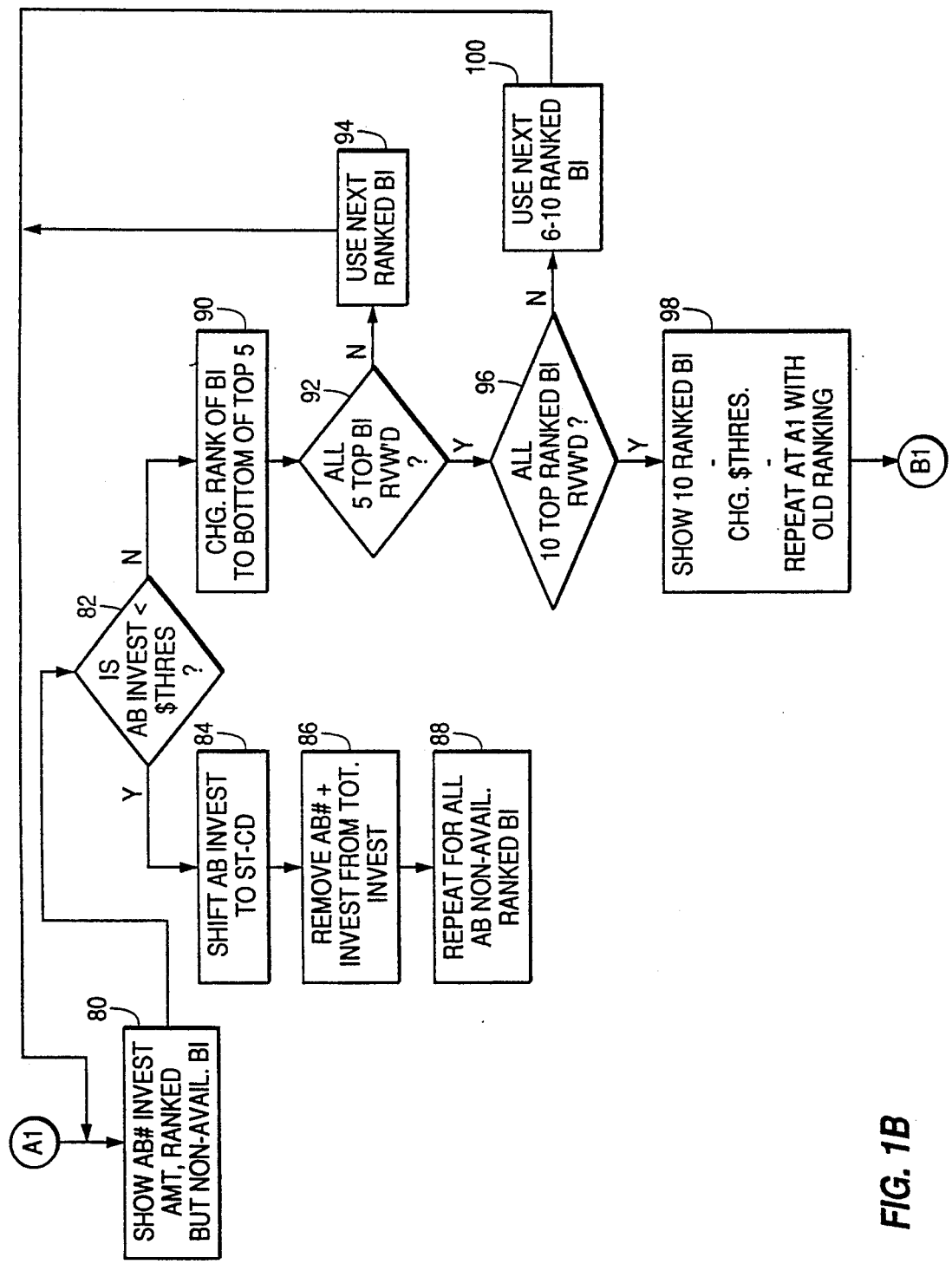

FIGS. 1A and 1B show the method and processing system, in diagrammatic flow chart form, which accomplish the objects and advantages set forth above.

The program starts in FIG. 1A at start step 10. In step 12, customer data is input into the system. This customer data may be kept as a customer record that includes the customer's name, address, customer identification number, social security number, and identifiers for each annuity contract funded or provided by the customer. The term "annuity beneficiary" as used herein covers any category of ownership in which an annuity contract can be held including individual accounts, joint accounts, various trust accounts, and any other legal form of ownership. For example, customer 1 may have annuity #1 which designates a single individual who will receive money when the contract is annuitized. That individual is classified herein as annuity beneficiary $AB_1$. $AB_1$ may be the customer himself or herself. The customer may also have a second annuity contract, annuity #2, which is held in joint names, e.g., husband and wife. This joint ownership is classified herein as a single annuity beneficiary $AB_{10}$. The system described herein incorporates this concept.

In step 14, information is input into the system regarding each annuity beneficiary AB. Table 1 below shows an exemplary annuity beneficiary record.

TABLE 1

Initial Annuity Beneficiary Record

AB Name, Add., AB# (e.g., $AB_1$)
B.I. data
$AB_1$—$BI_1$ is checking and savings
$AB_1$—$BI_2$ is savings—unqualified annuity
$BI_1$ and $BI_2$ classified as non-available for $AB_1$ In Table 1, the name, address, and identification number have been assigned to annuity beneficiary $AB_1$. In addition, $AB_1$ may have checking and savings accounts at a banking institution (BI) which is designated as $BI_1$. Annuity beneficiary $AB_1$ may also have a savings account such as a certificate of deposit (CD) is another banking institution $BI_2$. This CD held by $BI_2$ may be part of an unqualified annuity fund. The use of the term "unqualified" herein does not refer to whether the beneficiary obtains the benefit of special tax considerations but rather refers to an annuity that is not immediately protectable under depositor's insurance program as monitored by the present invention. In a preferred embodiment, banking institutions $BI_1$ and $BI_2$ are as classified as non-available banking institutions for annuity beneficiary $AB_1$.

Step 16 involves inputting banking institution BI data for each annuity beneficiary AB. Step 18 classifies the banking institution as available or non-available. For example, with respect to beneficiary $AB_1$, banking institutions $BI_1$ and $BI_2$ are classified as non-available. Step 20 involves repeating the inputting and classifying steps 12, 14, 16 and 18 for multiple customers and annuity beneficiaries. Step 22 compiles a matrix or list of banking institutions which are available and non-available. Table 2 below provides an exemplary list.

TABLE 2

| | Banking Institution Matrix | | |
|---|---|---|---|
| BI # | AVAIL | NON-AVAIL | CONDITION |
| $BI_1$ | $AB_{2,3,4,n}$ | $AB_1$ | A |
| $BI_2$ | $AB_{3,4,n}$ | $AB_{1,2}$ | A |
| $BI_3$ | $AB_{3,n}$ | $AB_{2,4}$ | A |
| $BI_4$ | $AB_{1,2,3,n}$ | $AB_4$ | B |
| $BI_5$ | $AB_{1,3,4,n}$ | $AB_2$ | A |
| $BI_6$ | $AB_{1,2,4,n}$ | $AB_3$ | C |
| $BI_7$ | — | — | A |
| $BI_n$ | $AB_{1,\ldots n-1}$ | $AB_n$ | A |

Table 2 generally shows banking institutions $BI_1$ through $BI_n$ and whether that institution is available for certain beneficiaries and not available for other beneficiaries. Additionally, the banking institution matrix shows the condition of the bank (A-E) which is directly related to the capital/debt ratio of the bank as well as other factors. An A quality bank is the highest rated bank. These ratings are known in the banking industry. Since a high quality financial product is provided by the present system, annuity funds invested in conjunction with the present system will normally be invested in only top quality banks. As stated earlier, the term "banking institution" includes all federally approved banks and savings and loans. These banking institutions must offer depositors deposit insurance which protects depositors' funds up to a predetermined insurance limit. The banking institution matrix, Table 2, shows that institution $BI_1$ can be used as an available institution by annuity beneficiaries $AB_2$, $AB_3$, $AB_4$, and $AB_n$. In contrast, institution $BI_1$ is classified as non-available for annuity beneficiary $AB_1$. This initial classification of banking institutions and identification of the annuity beneficiaries' banking institutions may be necessary in order to insure that, in the event of failure of that particular banking institution, the entire annuity fund invested for each beneficiary using the present system is fully insured. If an annuity beneficiary has bought a CD from a particular banking institution or otherwise has funds on deposit and that information has not been entered into the system, the federal deposit insurance may not cover both the investment made under the annuity fund provided by the present system and the independent investment by the annuity beneficiary. In order to provide a high degree of security, the present system gathers initial information regarding the banks used by annuity beneficiaries and classifies those banking institutions as non-available for the protected annuity monitored by the system. As can be seen in Table 2, institution $BI_7$ is available for all annuity beneficiaries since there are no beneficiaries who use that institution. Additionally, $BI_7$ is rated as an A institution.

In step 24, information regarding new investments is input into the system. These new investments could be initial investments by the customer to fund an annuity or could be periodic payments by the customer to fund the annuity. These new investments are posted both to the customer records as well as to the annuity beneficiary records. This dual posting is necessary because the customer will want a full accounting of all payments made into his or her annuity fund and the funds associated with each particular annuity beneficiary must be completely and accurately monitored in order to insure that each annuity beneficiary is protected under the federal depositors' insurance program. As stated earlier, the deposit insurance runs to the annuity contract owner, and the beneficiary may or may not be the customer. For example, a husband may fund an annuity for the benefit of his wife. In that case, the annuity beneficiary (annuitant/contract owner) would be the customer's wife. If the annuity investment or accumulated income plus the principal exceeds $100,000.00 in any particular banking institution (the current regulatory limit for deposits' insurance), the wife's insurable interest would be capped at $100,000.00. Accordingly, it is important to account for all investments made by the customers to fund one or more annuities and also to carefully account and monitor the value of each annuity contract and post that value to an annuity beneficiary record.

In step 26, data is input into the system to post all interest payments made by all institutions on certificates of deposit purchased from those institutions. These interest payments are collected for the benefit of particular annuity beneficiaries. As stated earlier, the company holding the annuity simply establishes an internal account for each annuity beneficiary. The company purchases one or more CDs sold by one or more banking institutions. As long as the internal accounts by the annuity company are not subject to claims by the company's creditors and are specifically designated for the benefit of an annuity beneficiary, the regulations regarding depositor's insurance provide that the annuity beneficiary's investment in a CD or other depository account of a particular banking institution is protected up to the insurable limit.

In step 28, the system compiles due date information for each CD, that is, the principal invested in the CD, the interest generated thereby, and the term of the CD and the interest payment dates. Step 30 involves displaying a money versus time statistic chart. In order to assist the investment manager, it is helpful to known when one or more CDs are coming due, the total investment in the CDs, and all interest payments that have been received or will be received from various banking institutions. This statistical money versus time chart will enable the investment manager to plan both short term and long term CD investments and match those investments with available aggregate funds. Of course, these aggregate funds include new customer annuity investments.

Decision step 32 determines whether the total investment for each annuity beneficiary in each banking institutions exceeds or is greater than an insured limit. The insured limit may be either the actual, government established, depositor's insurance limit value or may be another, lower predetermined insured limit established by the system operator. For example, the current established depositor's limit value is set at $100,000.00. The system operator may, in order increase the security of the funds, set a lower limit at $90,00.00. In any event, a decision is made in step 32 to determine whether a total investment, both principal and interest, for each annuity beneficiary in each banking institution exceeds the insured limit. If the insured limit per AB and per BI exceeds the insured limit, the YES branch is taken and in step 34, that particular banking institution is classified as non-available (NON-AVAIL) for that particular annuity beneficiary. If the NO branch is taken from decision step 32, that is, the insured limit has not been exceeded by the total investment per AB and per BI, step 36 requires re-classification of any banking institution that has returned or paid a CD as an available (AVAIL)

banking institution for all annuity beneficiaries who had designated funds in that CD. Step 36 also follows step 34.

Next, decision step 38 determines whether the interest, input in step 26, the new investments paid by a customer, input in step 24, plus the old investments from redeemed CDs exceed a large denomination certificate of deposit (LD-CD) threshold. Generally, an LD-CD is a CD of $5,000,000.00 or higher having a term of at least three years. Historically, these time deposits have a much higher rate of return as compared to individually purchased, smaller denomination short term CDs. If the threshold is not exceeded, the NO branch is taken and in step 40, the total investment is placed in short term CDs (ST-CD). In step 42, the system returns to start step 10. The LD-CD threshold may be set by the system operator, for example, at $10,000,000.00.

In order to better understand the present invention, Tables 3 and 4 below show the investment matrix or list and an expanded annuity beneficiary record. With respect to the investment matrix, and as an example, banking institution $BI_7$ has sold a large denomination certificate of deposit to the annuity or insurance company. The LD-CD is a $10,000,000.00 CD which falls due in seven years. This $10,000,000.00 was invested by the annuity company at time $t_1$. Interest is paid quarterly on the LD-CD at X % and the interest is automatically placed in a short term (ST-CD) having a three month maturity and paying interest at X−2.0%. The withdrawal penalty on the ST-CD is 0.25% interest.

TABLE 3

| | TIME | CD | $AB_1$ | $AB_2$ | $AB_3$ | ... | $AB_9$ | ... | $AB_n$ | Total |
|---|---|---|---|---|---|---|---|---|---|---|
| $BI/BI_7$ | | | | | | | | | | |
| | $t_1$ | $LD_1$ | 90K | 45K | 72K | | — | | 10K | 10M |
| | | ST | — | — | — | | — | | — | — |
| | $t_2$ | $LD_1$ | 90K | 45K | 72K | | — | | 10K | 10M |
| | | $ST_1$ | 10K | 5K | 7.5K | | — | | 1.2K | 23.7K |
| | $t_3$ | $LD_1$ | 90K | 45K | 72K | | — | | 10K | 10M |
| | | $ST_2$ | 10K | 10K | 15K | | 80K | | 2.4K | 117.4K |
| $BI_8$ | | | | | | | | | | |
| | $t_3$ | $ST_3$ | 11K | — | — | | — | | — | 11K |

The investment matrix, Table 3, shows that at time $t_1$, the company operating the present system has invested in long term CD $LD_1$ and various annuity beneficiaries have accounts associated with or designating that $LD_1$. For example, annuity beneficiary $AB_1$ has $90,000.00 invested (90K). Beneficiary $AB_3$ has invested $72,000.00 (72K). Annuity beneficiary $AB_9$ has not invested in $LD_1$ at time $t_1$. Annuity beneficiary $AB_n$ has invested $10,000.00 (10K). At time $t_1$, there is no short term (ST) CD issued by institution $BI_7$. At time $t_2$, which is the first quarterly interest payment date for $LD_1$, each annuity beneficiary has the same amount of principal designated for $LD_1$. However, according to the terms of the agreement with institution $BI_7$, a second, short term CD, $ST_1$, has been opened into which all the interest from $LD_1$ is swept. Accordingly, the records of the company issuing the federally insured annuities show that annuity beneficiary $AB_1$ has a designated 10K in CD $ST_1$ issued by institution $BI_7$, beneficiary $AB_2$ has 5K invested in $ST_1$, and beneficiary $AB_n$ has 1.2K invested in that CD. At time $t_3$, which is the second quarterly payment date for $LD_1$, the interest has been rolled over into a second short term CD, $ST_2$. However, because beneficiary $AB_1$ is at the government insured limit of $100,000.00, his or her allocation has been shifted to a second banking institution $BI_8$ and placed in short term CD deposit $ST_3$. Accordingly, $AB_1$ has a designated investment of $11,000.00 (11K) in short term CD $ST_3$ sold by institution $BI_8$ as well as a 10K designated investment in $ST_2$ at institution $BI_7$. The other beneficiaries $AB_2$, $AB_3$, and $AB_n$, have had their interest payments rolled directly over into short term CD $ST_2$. The investment by or for beneficiary $AB_9$, that is 80K, is a new investment by the customer funding that particular annuity contract. Accordingly, annuity beneficiary $AB_1$ has reached the insured limit in institution $BI_7$ and $BI_7$ is then classified as a non-available banking institution for annuity beneficiary $AB_1$. However, $BI_7$ is still classified as available for $AB_2$, $AB_3$, $AN_n$ and $AB_9$, although $AB_9$ is near the predetermined insurance limit of $100,000.00.

Table 4 which follows shows an expanded annuity beneficiary record.

TABLE 4

Expanded Annuity Beneficiary Record

Basic Data
$Cust_1$; Annuity #1; $AB_1$
NON-AVAIL. BI = $BI_{1,2}$ note: checking and savings BIs
NON-AVAIL. BI = $B_7$ note: maximum reached at $t_3$
Investment Data

| BI # | Inst'mt # | Invest Date | P'al | Est. Int. | Period | Due Date |
|---|---|---|---|---|---|---|
| $BI_7$ | $LD_1$ | $t_1$ | 90K | 10K | Qtrly | $t_1$ + 7 yrs |
| $BI_7$ | $ST_1$ | $t_2$ | 10K | 1K | Qtrly | $t_2$ + 3 mths |
| $BI_8$ | $ST_2$ | $t_3$ | 11K | 1.01K | Qtrly | $t_3$ + 3 mths |

The basic record includes customer data, that is, who is funding the annuity, and annuity contract identifier (annuity #1) and an annuity beneficiary identifier ($AB_1$). The basic record also includes a record of non-available institutions, $BI_1$ and $BI_2$ and includes a remark stating that those institutions are checking and savings for $AB_1$. Institution $BI_7$ which was classified as non-available at time $t_3$ due to the level of funds in that designated institution. The expanded annuity beneficiary record also includes investment records. The investment record is broken down into banking institution $BI_7$ and $BI_8$, includes instrument numbers CD#, initial investment dates $t_1$, $t_2$ and $t_3$, principal investments made in those particular CDs, estimated interest payments, the interest due dates, and the CD due date. The investment record for each particular annuity beneficiary can also be used as certificate of deposit data for compiling the money and time statistics in step 30. If, for example, a significant influx of new investments was gathered by the system operator (450K) and interest of 50K was available in two weeks and if a 500K short term CD was available in three weeks, the system operator may choose to pay the interest penalty on the 500K short term CD and purchase a large denomination CD ($1,000,000.00) at the time the interest is paid by the other banking institution in two weeks. In the interim, the initial 450K investment could be placed in a short term CD.

In step 44, the system operator places an offer to buy a large denomination CD (LD-CD). These large denomination CDs are sometimes called bank investment contracts. In step 46, the system operator reviews the bids placed by the various banking institutions $BI_1$, $BI_2$ for the large denomination CD. These bids would include all terms associated with the CD including principal amount, number of years, interest due on the principal, and time for interest payments.

In step 50, the banking institution or another third party information provider inputs information relative to the condition of the banking institution, that is, A, B, C, D, or E or other known classifications. The condition of the banking institution is directly related to the capital/debt ratio. Since large amounts of money are placed with a particular institution, the capital/debt ratio may play an important role in determining the ranking of the institutions and the top qualifying bids therefrom. In step 52, the various bids and, more importantly, the banking institutions are rated from high to low. The investment manager or the system operator may work with the system in order to rank the various bids. In step 54, a list of non-available banking institutions is compiled for all annuity beneficiary investors who will participate in the LD-CD investment. Table 4, the expanded annuity beneficiary record, shows non-available banks $BI_1$, $BI_2$ and $BI_7$ associated with annuity beneficiary $AB_1$.

In step 60, a comparison is made between the bid list, the beneficiaries designated to invest and the non-available banking institutions associated therewith. Step 62 is a decision step which determines whether any of the top five ranked banking institutions are classified as non-available for all annuity beneficiaries who will invest in the designated CDs offered by the top five institutions. Assuming that all top five institutions are not classified as non-available, that is they are available, step 64 involves selection of one of the top five bids. Step 66 commands the investment of the money into the selected banking institution and particularly the purchase of the large denomination, relatively long term CD.

In step 68, a compilation of customer data, annuity beneficiary data, and banking institution data is prepared. Reports are generated and posted. For example, customers will want to know the total investments directed to a particular annuity contract, the value of the annuity contract account, the interest generated by that account, and may be concerned regarding the insurance protection offered under this system. Accordingly, a report showing the non-available banks for a particular annuity beneficiary may be prepared for each customer. In any event, the investment manager for the system should use a listing of non-available as well as available banking institutions in order to properly invest the funds. In step 70, the system pays money to beneficiaries under annuitized contracts or redeems contracts that have been canceled. These payments are posted and the appropriate notations are made in the customer records, annuity beneficiary records and investment matrices. Of course, certain institutions would be reclassified as available if beneficiary funds therein dropped below the insured level. Step 72 returns the program to its beginning, start step 10.

Returning to decision step 62, the YES branch goes from jump point A1 in FIG. 1A to jump point A1 in FIG. 1B. Step 80 shows the beneficiary ID, AB#, the investment amount for that beneficiary and the ranked but non-available banking institution. This is a result of the decision step 62 determining that one or more of the top five ranked banking institutions have been designated as non-available for one or more beneficiaries. Of course, rather than ranking five institutions in step 62, ten institutions could be ranked and analyzed in step 80. Five institutions are ranked herein as an example. Following step 80, decision step 82 determines whether the particular investment for a particular annuity beneficiary is less than a dollar threshold value ($THRES). The YES branch from decision step 82 enters step 84. If the investment for a particular annuity beneficiary is small, for example the investment in short term deposit $ST_2$ for annuity beneficiary $AB_n$ in Table 3, 2.4K, the 2.4K investment is shifted to a short term CD. Alternatively, the small investment for the annuity beneficiary can be placed on deposit with any institution that is classified as available. The funds need not be placed in a time deposit (i.e., CD) to obtain the benefit of depositor's insurance. However, it would be prudent to use CDs rather than designate checking or savings accounts due to the higher return on investment. Step 86 removes the beneficiary's investment from the large denomination CD investment. This enables the system to use the top ranked institution for all beneficiaries except $AB_n$. Step 88 repeats steps 80, 82, 84, 86 for all annuity beneficiaries having designated funds and non-available classifications for the ranked banking institutions.

If the NO branch from decision step 82 is taken, in step 90, the ranking of the banking institutions is changed. For example, if $AB_9$ having a deposit of 80K is larger than the money threshold used in step 82, (see Table 3), it is beneficial to change the ranking of the top five banking institutions such that the top ranked institution is placed at the bottom of the five stacked institutions. Decision step 92 determines whether all five banking institutions have been reviewed. If not, the NO branch is taken and in step 94, the next ranked banking institution is used and steps 80 and 82 are repeated. Of course, if the next ranked banking institution is not designated as non-available by any annuity beneficiaries, the program would jump to step 64, the select banking institution in FIG. 1A.

If the YES branch is taken from decision step 92, decision step 96 determines whether all top ten ranked banking institutions have been reviewed. If all ten top ranked institutions have been reviewed resulting in all ten institutions classified as non-available and having substantial beneficiary participation in the LD-CD), the YES branch is taken and step 98 shows the top ten ranked institutions, prompts the system operator to change the money threshold ($THRES) in decision step 82, and repeats the process beginning at jump point A1 with the old ranking. If the NO branch is taken from decision step 96, that is, not all top ten institutions have been reviewed, step 100 uses the next group of five ranked institutions, that is institutions six through ten. The program returns to step 80 which shows whether institutions six through ten are designated as non-available by any annuity beneficiary. This process continues until a particular banking institution is selected and jump point B1 returns to select institution step 64 in FIG. 1A. Other automated selection routines could be used to select institutions.

Figure 2:
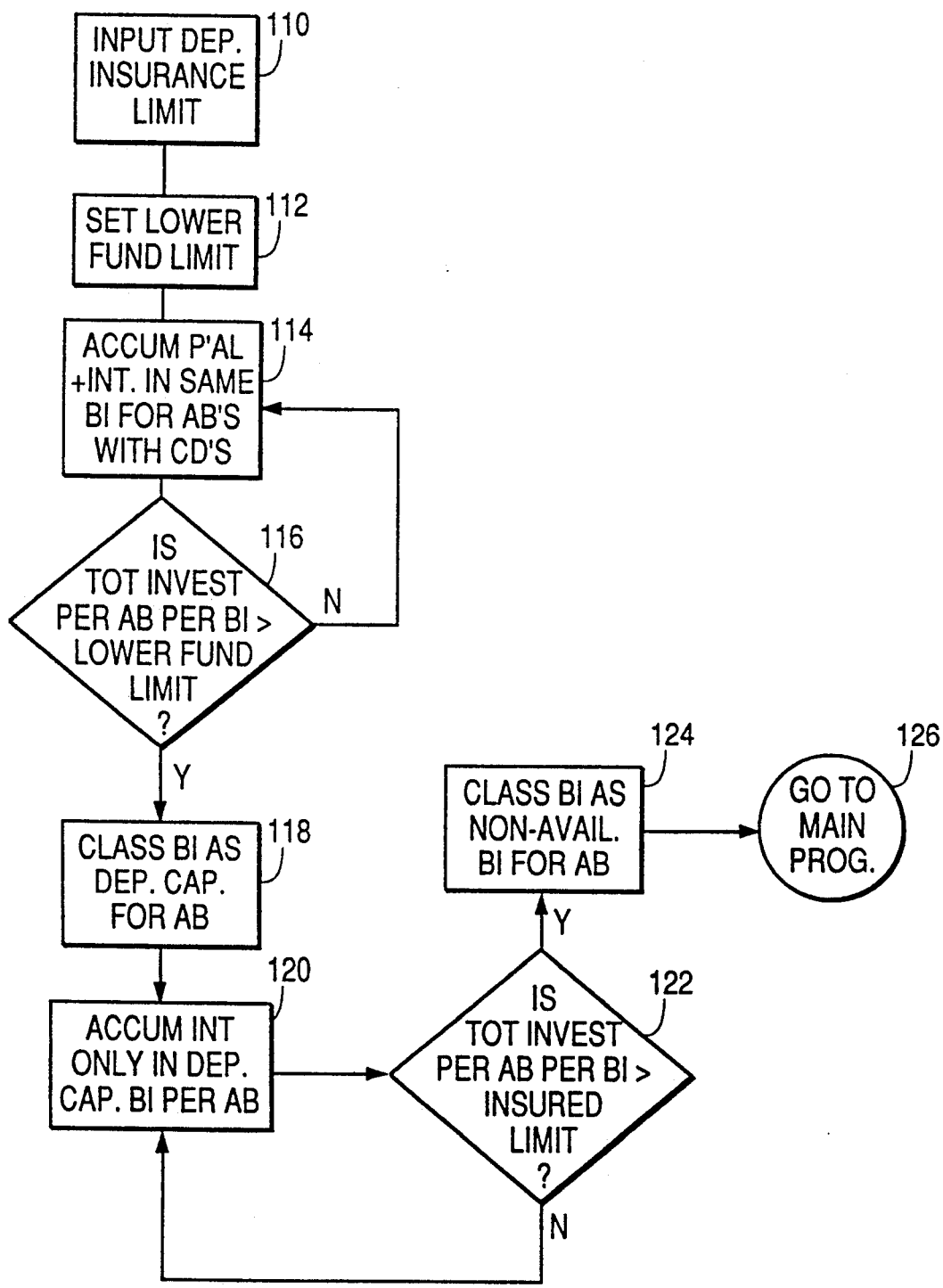
FIG. 2 diagrammatically illustrates a method and system permitting the accumulation of interest in a particular banking institution.

The system may be modified such that interest paid by a particular banking institution based upon a first CD investment is automatically swept into a second CD investment at the same bank. In this modified system, two limits are set, a lower fund limit which designates a banking institution as an deposit capped institution, and an insured limit which ultimately is used to classify the banking institution as non-available. FIG. 2 diagrammatically shows this aspect of the system. In step 110, data is input into the system regarding the government established, depositor's insurance limit value. Step 112 establishes a lower fund limit which is less than the depositor's insurance limit value. In step 114, the interest and principal are accumulated in the same banking institution for all annuity beneficiaries having designated CDs in that particular institution. The interest is preferably swept into a CD. However, if the interest is swept into any type of deposit account at the institution, whether a time deposit or other account, the annuity beneficiary obtains the benefit of depositor's insurance. This feature of using other types of deposit accounts is encompassed by the present system. Decision 116 determines whether the total investment for each annuity beneficiary for that particular banking institution exceeds the lower fund limit. The NO branch from decision step 116 returns to step 114, accumulate principal and interest in the same BI. At this point, new investments can be posted to the BI for the beneficiary.

The YES branch from decision step 116 enters step 118 which classifies the particular banking institution as deposit capped for a particular annuity beneficiary. For example, the investment manager of the system should know that a large investment by a particular annuity beneficiary in a particular CD will generate a certain amount of interest over a certain period of time. For example, a $50,000.00 investment in a large denomination, seven year CD may generate $50,000.00 in interest over the total term of the CD. If a particular annuity beneficiary designates $50,000.00 as an initial investment in that CD, that banking institution would be classified as deposit capped (the lower fund limit set at $50,000.00) and all interest assigned to that annuity beneficiary would be swept into short term and possibly long term CDs with that particular banking institution. All CDs would mature on or before the seven year maturity date of the large denomination CD with the institution. In this instance, the lower fund limit would be set at $50,000.00.

Step 120 follows step 118 and only interest is accumulated in the deposit capped banking institutions for the particular annuity beneficiary. In other words, no new principal investments would be made for that beneficiary in that particular banking institution. Decision step 122 follows step 120 and a determination is made whether the total investment per annuity beneficiary in each banking institution exceeds the insured limit. The insured limit is set at $100,000.00. The NO branch returns to accumulate interest step 120. The YES branch leads to step 124 which classifies the particular banking institution as a non-available institution for the particular annuity beneficiary. Step 124 leads to jump step 126 GO BACK TO MAIN PROGRAM. The main program would be entered at any convenient point, possibly immediately before step 32.

Although the example provided herein regarding the large denomination CD involves rolling over the interest in a short term CD, it is most likely that under the terms of the LD-CD, the interest would be allowed to accumulate with the principal and such interest would be compounded with the principal. The interest rate on the accumulated fund would be the interest rate for the LD-CD.

The present invention can be used for monitoring annuity funds for any type of annuity. For example, some annuity contracts provide for an initial large payment, for example $1,000,000.00, which would be deposited in at least ten institutions under the present system, and the annuity pays periodically, for example quarterly, $30,000.00 to the annuity beneficiary. Another type of annuity funds a retirement plan for the annuity beneficiary. When the annuity beneficiary reaches retirement age, at age 65, the annuity contract may be annuitized and a lump sum payment or other payment plan is made to the annuity beneficiary. The annuity beneficiary may decide to receive periodic payments for a number of years rather than a lump sum. This retirement annuity is called a deferred annuity. The deferred annuity has certain tax advantages such that interest accumulated on the principal is accumulated tax free. If the principal or interest are withdrawn from a deferred annuity before retirement age, there are adverse tax consequences associated with such withdrawal.

The order of the steps set forth above is only exemplary. For example, the pay annuity step 70 may precede the display money and time statistics step 30. The classification of banks, steps 32, 34 and 36 can precede step 60. These modifications fall within the spirit and scope of the present invention.

The present system has been described as monitoring annuity funds deposited in federally approved banking institutions. However, the government regulations also provide insurance for funds deposited in such institutions in accordance with a life insurance program. As is know, a life insurance contract, funded by a customer, customarily provides that, upon death of a named individual, the life insurance company will pay one or more named life insurance beneficiaries. Whole life insurance contracts permit the customer or a named individual to withdraw money from the life insurance fund or borrow against the fund before the death of the named individual. The life insurance beneficiary and the person entitled to withdraw or borrow against the life insurance fund (the policy owner) is called herein a "life insurance designee." The government regulations provide that funds deposited in a federally approved banking institution by a life insurance company under a life insurance contract for the benefit of a life insurance designee are insured by depositor's insurance up to the established government insurance limit. Accordingly, the present system described above with respect to FIGS. 1A, 1B and 2 can be easily adopted by a life insurance company to reap the benefits of depositor's insurance. Rather than monitoring annuity beneficiaries, the system monitors life insurance designees' institutions and life insurance designees' funds deposited in the approved and available banking institutions. The claims appended hereto are meant to cover this alternate embodiment of the present invention.

The claims appended hereto are meant to cover modifications and changes within the spirit and scope of the present invention.

What is claimed is:

1. A computer-based method for electronically processing transactional data and monitoring funds for a plurality of annuities, purchased by a plurality of customers funding said annuities, to obtain the benefit of depositor's insurance available through a plurality of federally approved banking institutions, said depositor's insurance protecting funds less than a predetermined insured limit, said computer-based method comprising the steps of:

electronically identifying, inputting and storing annuity fund data, associated customer data, annuity beneficiary data, and banking institution data;

electronically classifying and labeling all banking institutions which hold non-annuity funds and unqualified annuity funds for each annuity beneficiary with a non-available banking institutions label for each respective annuity beneficiary after the step of identifying;

electronically determining whether the sum of all annuity funds, identified with a single annuity beneficiary and designated for certificates of deposit issued by one of said plurality of banking institutions which is not labeled as a non-available banking institution, exceeds said insured fund limit and if so, classifying and electronically labeling said one banking institution with said non-available banking institution label for said single annuity beneficiary;

electronically commanding and ordering the transfer of all annuity funds identified with said single annuity beneficiary and designated for said one banking institution in excess of said insured fund limit to a certificate of deposit issued by another one of said plurality of banking institutions which is not labeled as a non-available banking institution; and, electronically determining the excess funds over said insured fund limit, classifying and electronically labeling the banking institution as non-available, and commanding and electronically ordering the transfer of excess funds, for all banking institutions designated to hold certificates of deposit for all annuity beneficiaries to obtain the benefit of said depositor's insurance for qualified annuity funds.

2. A method as claimed in claim 1 wherein the step of identifying and storing includes identifying and storing annuity fund data, which describes each annuity fund that is established for the benefit of each annuity beneficiary; wherein said associated customer data identifies the person funding the annuity; wherein said annuity beneficiary data identifies the beneficiary of the annuity; and wherein said banking institution data, identifies all banking institutions holding said annuity funds for respective annuity beneficiaries.

3. A method as claimed in claim 2 including the steps of:

electronically inputting data regarding government established depositor's insurance limit value;

establishing said predetermined insured limit as one of said depositor's insurance limit value or a predetermined lower value.

4. A method as claimed in claim 3 wherein the step of identifying includes the step of identifying annuity funds as qualified annuity funds and unqualified annuity funds wherein said qualified annuity funds are protectable under said depositor's insurance and said unqualified annuity funds are not protectable under said depositor's insurance.

5. A method as claimed in claim 4 including the step of electronically maintaining and producing, prior to a pooled investment, a list of available banking institutions, which have not been classified as non-available banking institutions, and a list of non-available labeled banking institutions for each respective annuity beneficiary.

6. A method as claimed in claim 4 wherein the step of determining whether the sum of all annuity funds exceeds said predetermined insured limit includes the step of summing all interest payments made on annuity funds and designated for said one banking institution.

7. A method as claimed in claim 5 including the steps of electronically identifying and storing certificate of deposit data along with said annuity fund data, said certificate of deposit data including information relative to a due date of respective certificates of deposit, and including the step of electronically declassifying a respective banking institution from non-available to available when a corresponding certificate of deposit is due.

8. A computer-based method for electronically processing and monitoring funds for a plurality of annuities, purchased by a plurality of customers funding said annuities, to obtain the benefit of depositor's insurance available through a plurality of federally approved banking institutions, said depositor's insurance protecting funds less than a predetermined insured limit, said computer-based method comprising the steps of:

providing a computer system for the input, output, correlation and storage of customer data, annuity beneficiary data, annuity fund data, and banking institution data;

via said computer system:

(a) electronically identifying and storing data describing each annuity fund, held for the benefit of each annuity beneficiary, and associated customer data, representing the person funding the annuity, annuity beneficiary data, representing the beneficiary of the annuity, and banking institution data, representing all banking institutions holding said annuity funds of said plurality of banking institutions;

(b) electronically classifying and labeling all banking institutions which hold non-annuity funds and unqualified annuity funds for each annuity beneficiary as non-available banking institutions for each respective annuity beneficiary;

(c) electronically calculating the sum of all annuity funds identified with a single annuity beneficiary designated for certificates of deposit issued by one of said plurality of banking institutions which is not labeled as a non-available banking institution;

(d) electronically determining whether the sum obtained in step (c) exceeds said insured fund limit and if so, classifying and electronically labeling said one banking institution as a non-available banking institution for said single annuity beneficiary;

(e) electronically commanding and ordering the transfer of all annuity funds identified with said single annuity beneficiary and designated for said one banking institution in excess of said insured fund limit to a certificate of deposit issued by another one of said plurality of banking institutions which is not labeled as a non-available banking institution;

(f) repeating steps (c) through (e) for all banking institutions designated and electronically identified to hold annuity funds for said single annuity beneficiary to obtain the benefit of said depositor's insurance for qualified annuity funds;

(g) repeating steps (c) through (f) for all annuity beneficiaries;

(i) generating a periodic printed out report showing the sum of all annuity funds for a respective annuity beneficiary provided by a corresponding customer and which obtain the benefit of said depositor's insurance for said qualified annuity funds; and, (j) generating at least one further printed out report showing all non-available banking institutions for each said respective annuity beneficiary.

9. A method as claimed in claim 8 including the steps of:
   electronically inputting data regarding government established depositor's insurance limit value;
   establishing said predetermined insured limit as one of said depositor's insurance limit value or a predetermined lower value.

10. A method as claimed in claim 9 wherein the step of identifying includes the step of identifying annuity funds as qualified annuity funds and unqualified annuity funds wherein said qualified annuity funds are protectable under said depositor's insurance and said unqualified annuity funds are not protectable under said depositor's insurance.

11. A method as claimed in claim 10 including the step of electronically maintaining a list of available banking institutions, which have not been classified as non-available banking institutions, and non-available banking institutions for each respective annuity beneficiary.

12. A method as claimed in claim 10 wherein the step of determining whether the sum of all annuity funds exceeds said predetermined insured limit includes the step of summing all interest payments made on annuity funds and designated for said one banking institution.

13. A method as claimed in claim 11 including the steps of electronically identifying and storing certificate of deposite data along with said annuity fund data, said certificate of deposit data including information relative to a due date of respective certificates of deposit, and including the step of electronically declassifying a respective banking institution from non-available to available when a corresponding certificate of deposit is due.

14. A computer-based method for electronically processing transactional data and monitoring funds for a plurality of annuities, purchased by a plurality of customers funding said annuities, to obtain the benefit of depositor's insurance available through a plurality of federally approved banking institutions, said depositor's insurance protecting funds less than a predetermined insured limit, said computer-based method comprising the steps of:
   electronically identifying, inputting and storing annuity fund data, associated customer data, annuity beneficiary data, and banking institution data;
   electronically classifying all banking institutions which hold non-annuity funds and unqualified annuity funds for each annuity beneficiary as non-available banking institutions for each respective annuity beneficiary;
   establishing a predetermined fund limit less than said predetermined insured limit;
   electronically determining whether the sum of all annuity funds, identified with a single annuity beneficiary and designated for certificates of deposit issued by one of said plurality of banking institutions which is not classified as a non-available banking institution, exceeds said predetermined fund limit and if so, classifying said one banking institution as an deposit capped banking institution for said single annuity beneficiary;
   electronically inputting data relative to interest payments made on all annuity funds held in deposit capped banking institutions for a respective annuity beneficiary and determining whether all annuity funds identified with said single annuity beneficiary and designated for said one banking institution, including interest payments, exceeds said insured fund limit and if so, classifying said deposit capped banking institution as a non-available banking institution;
   electronically commanding the transfer of all additional annuity funds identified with said single annuity beneficiary and designated for said one banking institution in excess of said predetermined fund limit to be deposited in another one of said plurality of banking institutions which is not classified as a non-available banking institution; and,
   electronically determining the excess funds over said predetermined fund limit and said insured fund limit, classifying the banking institution as deposit capped and non-available, respectively, and commanding the transfer of excess funds, for all banking institutions designated to hold certificates of deposit for all annuity beneficiaries to obtain the benefit of said depositor's insurance for qualified annuity funds.

15. A computer-based system for electronically processing annuity funds to obtain the benefit of depositor's insurance available through a plurality of federally approved banking institutions, said depositor's insurance protecting funds less than a predetermined insured limit, said computer-based system comprising:
   means for electronically inputting and storing annuity fund data and associated customer data, annuity beneficiary data, and banking institution data;
   means for classifying, electronically labeling and maintaining an electronically callable and displayable list of all banking institutions which hold non-annuity funds and unqualified annuity funds for each annuity beneficiary as non-available banking institutions for each respective annuity beneficiary;
   means for determining whether the sum of all annuity funds, identified with a single annuity beneficiary and designated for certificates of deposit issued by one of said plurality of banking institutions which is not classified and labeled as a non-available banking institution, exceeds said insured fund limit and if so, classifying and automatically and electronically labeling said one banking institution with a non-available banking institution label for said single annuity beneficiary;
   means for commanding and electronically ordering the transfer of all annuity funds identified with said single annuity beneficiary and designated for said one banking institution in excess of said insured fund limit to a certificate of deposit issued by another one of said plurality of banking institutions which is not labeled as a non-available banking institution; and,
   means for determining excess funds over said insured fund limit, classifying and electronically labeling the banking institution as non-available, and commanding the transfer of excess funds, for all banking institutions designated to hold certificates of deposit for all annuity beneficiaries to obtain the benefit of said depositor's insurance for qualified annuity funds.

16. A system as claimed in claim 15 including means for maintaining a callable, composite listing of all banking institutions which are not non-available banking institutions for each annuity beneficiary; and means for classifying and maintaining a callable list of all banking institutions which hold non-annuity funds and unqualified annuity funds for each annuity beneficiary as non-available banking institutions for each respective annuity beneficiary.

17. A system as claimed in claim 16 including means for inputting data regarding government established depositor's insurance limit value; and, means for establishing said predetermined insured limit as one of said depositor's insurance limit value or a predetermined lower value.

18. A system as claimed in claim 16 wherein said means for classifying utilizes annuity fund data, annuity beneficiary data and banking institution data from said means for inputting and storing and further includes means for identifying annuity funds as qualified annuity funds and unqualified annuity funds wherein said qualified annuity funds are protectable under said depositor's insurance and said unqualified annuity funds are not protectable under said depositor's insurance.

19. A system as claimed in claim 18 wherein said annuity fund data includes data regarding interest flowing from said annuity funds.

20. A system as claimed in claim 19 including means for maintaining a callable, composite listing of all banking institutions which are not non-available banking institutions for each annuity beneficiary.

21. A system as claimed in claim 20 including means for compiling and producing reports showing all available banking institutions for each annuity beneficiary and the sum of all annuity funds for a respective annuity beneficiary which is protected by said depositor's insurance.

22. A system as claimed in claim 16 wherein said means for inputting and storing includes inputting and storing certificate of deposit data along with said annuity fund data, said certificate of deposit data including information relative to a due date of respective certificates of deposit, and the system includes means for declassifying a respective banking institution from non-available to available when a corresponding certificate of deposit is due and the annuity funds are withdrawn.

23. A computer-based method for electronically processing transactional data and monitoring funds for a plurality of annuities, purchased by a plurality of customers funding said annuities, to obtain the benefit of depositor's insurance available through a plurality of federally approved banking institutions, said depositor's insurance protecting funds less than a predetermined insured limit, said computer-based method comprising the steps of:
  electronically identifying, inputting and storing annuity fund data, associated customer data, annuity beneficiary data, and banking institution data;
  electronically classifying and labeling all banking institutions which hold non-annuity funds and unqualified annuity funds for each annuity beneficiary with a non-available banking institutions for each respective annuity beneficiary after the step of identifying;
  electronically determining whether the sum of all annuity funds, identified with a single annuity beneficiary and designated for certificates of deposit issued by one of said plurality of banking institutions which is not labeled as a non-available banking institution, exceeds said insured fund limit and if so, classifying and electronically labeling said one banking institution with said non-available banking institution labeled for said single annuity beneficiary;
  electronically commanding the transfer of all annuity funds identified with said single annuity beneficiary and designated for said one banking institution in excess of said insured fund limit to be deposited in another one of said plurality of banking institutions which is not classified as a non-available banking institution; and,
  electronically determining the excess funds over said insured fund limit, classifying the banking institution as non-available, and commanding the transfer of excess funds, for all banking institutions designated to hold certificates of deposit for all annuity beneficiaries to obtain the benefit of said depositor's insurance for qualified annuity funds.

24. A computer-based system for processing annuity funds to obtain the benefit of depositor's insurance available through a plurality of federally approved banking institutions, said depositor's insurance protecting funds less than a predetermined insured limit, said computer-based system comprising:
  means for inputting and storing annuity fund data and associated customer data, annuity beneficiary data, and banking institution data;
  means for classifying and maintaining a callable list of all banking institutions which hold non-annuity funds and unqualified annuity funds for each annuity beneficiary as non-available banking institutions for each respective annuity beneficiary;
  means for determining whether the sum of all annuity funds, identified with a single annuity beneficiary and designated for certificates of deposit issued by one of said plurality of banking institutions which is not classified as a non-available banking institution, exceeds said insured fund limit and if so, classifying said one banking institution as a non-available banking institution for said single annuity beneficiary;
  means for commanding the transfer of all annuity funds identified with said single annuity beneficiary and designated for said one banking institution in excess of said insured fund limit to be deposited in another one of said plurality of banking institutions which is not classified as a non-available banking institution; and,
  means for determining excess funds over said insured fund limit, classifying the banking institution as non-available, and commanding the transfer of excess funds, for all banking institutions designated to hold certificates of deposit for all annuity beneficiaries to obtain the benefit of said depositor's insurance for qualified annuity funds.

25. A computer-based method for electronically processing transactional data and monitoring funds for a plurality of life insurance contracts, purchased by a plurality of customers funding said life insurance contracts, to obtain the benefit of depositor's insurance available through a plurality of federally approved banking institutions, said depositor's insurance protecting funds less than a predetermined insured limit, said computer-based method comprising the steps of:

electronically identifying, inputting and storing life insurance fund data, associated customer data, life insurance beneficiary data, and banking institution data;

electronically classifying all banking institutions which hold funds for each life insurance beneficiary as non-available banking institutions for each respective life insurance beneficiary after the step of identifying;

electronically determining whether the sum of all life insurance funds, identified with a single life insurance beneficiary and designated for certificates of deposit issued by one of said plurality of banking institutions which is not classified as a non-available banking institution, exceeds said insured fund limit and if so, classifying said one banking institution as a non-available banking institution for said single life insurance beneficiary;

electronically commanding the transfer of all life insurance funds identified with said single life insurance beneficiary and designated for said one banking institution in excess of said insured fund limit to be deposited in another one of said plurality of banking institutions which is not classified as a non-available banking institution; and, electronically determining the excess funds over said insured fund limit, classifying the banking institution as non-available, and commanding the transfer of excess funds, for all banking institutions designated to hold certificates of deposit for all life insurance beneficiaries to obtain the benefit of said depositor's insurance.

26. A computer-based system for processing life insurance funds to obtain the benefit of depositor's insurance available through a plurality of federally approved banking institutions, said depositor's insurance protecting funds less than a predetermined insured limit, said computer-based system comprising:

means for inputting and storing life insurance fund data and associated customer data, life insurance beneficiary data, and banking institution data;

means for classifying and maintaining a callable list of all banking institutions which hold funds for each life insurance beneficiary as non-available banking institutions for each respective life insurance beneficiary;

means for determining whether the sum of all life insurance funds, identified with a single life insurance beneficiary and designated for certificates of deposit issued by one of said plurality of banking institutions which is not classified as a non-available banking institution, exceeds said insured fund limit and if so, classifying said one banking institution as a non-available banking institution for said single life insurance beneficiary;

means for commanding the transfer of all life insurance funds indentified with said single life insurance beneficiary and designated for said one banking institution in excess of said insured fund limit to be deposited in another one of said plurality of banking institutions which is not classified as a non-available banking institution; and, means for determining excess funds over said insured fund limit, classifying the banking institution as non-available, and commanding the transfer of excess funds, for all banking institutions designated to hold certificates of deposit for all life insurance beneficiaries to obtain the benefit of said depositor's insurance.

* * * * *